United States Patent [19]

Lusignan

[11] Patent Number: 4,914,651
[45] Date of Patent: Apr. 3, 1990

[54] CELLULAR DATA SYSTEM

[75] Inventor: Bruce Lusignan, Stanford, Calif.

[73] Assignee: Cellular Data, Inc., Palo Alto, Calif.

[21] Appl. No.: 247,040

[22] Filed: Sep. 20, 1988

[51] Int. Cl.$^4$ .............................................. H04J 1/02
[52] U.S. Cl. ................................. 370/69.1; 370/110.1; 455/33; 379/59
[58] Field of Search .................. 455/33, 34, 56, 53, 455/54; 379/59, 60, 63; 370/69.1, 76, 110.1, 110.4, 111, 89

[56] References Cited

U.S. PATENT DOCUMENTS

| | | | |
|---|---|---|---|
| 3,898,390 | 8/1975 | Wells et al. | 455/33 |
| 4,025,853 | 5/1977 | Addeo | 455/33 |
| 4,128,740 | 12/1978 | Graziano | 455/33 |
| 4,144,496 | 3/1979 | Cunningham et al. | 455/33 |
| 4,355,411 | 10/1982 | Reudink et al. | 455/33 |
| 4,384,362 | 5/1983 | Leland | 379/59 |
| 4,613,990 | 9/1986 | Halpern | 379/60 |
| 4,696,027 | 9/1987 | Bonta | 455/33 |
| 4,747,101 | 5/1988 | Akaiwa et al. | 370/89 |
| 4,792,984 | 12/1988 | Matsuo | 379/59 |

Primary Examiner—Douglas W. Olms
Assistant Examiner—Alpus H. Hsu
Attorney, Agent, or Firm—Flehr, Hohbach, Test, Albritton & Herbert

[57] ABSTRACT

An improved AMPS cellular system where non-interfering digital communication channels are added to the existing analog or digital voice communications channels in the system by utilizing frequency space between channels made possible by the AMPS co-channel and adjacent channel frequency coordination procedures. Interference is prevented by reduction of power, selection of frequencies, proper modulation and demodulation techniques, and unique allocation to the channels in frequency and location. The system is also applicable in general to the insertion of narrow frequency bandwidth channels in any existing communications system using co-channel and adjacent channel frequency allocation strategies.

12 Claims, 6 Drawing Sheets

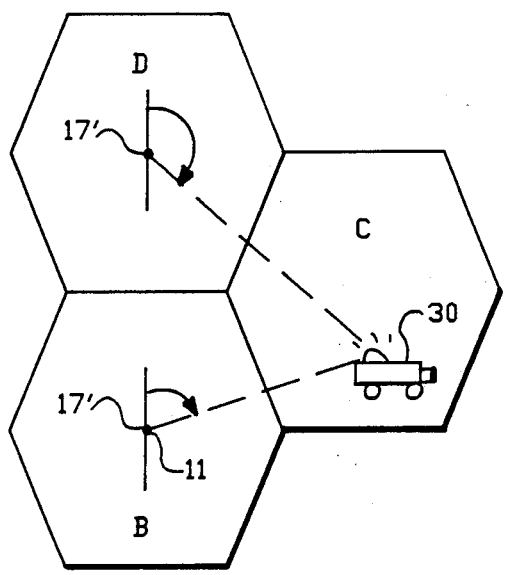
FIG.-9
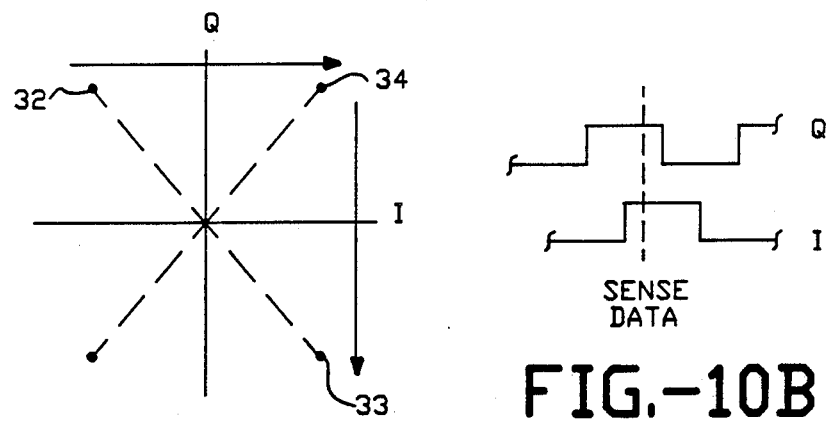
FIG.-10A
FIG.-10B

CELLULAR DATA SYSTEM

The present invention is directed to the introduction of numerous additional digital communications channels to an existing communications system already having several communications channels. More specifically, it is directed to the introduction of such additional channels in a cellular telephone system, whether in today's primarily analog system or future primarily digital systems.

BACKGROUND OF THE INVENTION

Because of the crowded electromagnetic spectrum used for communications, it is useful to, in effect, squeeze extra communications channels into an already established communications band or system. In the microwave field, extra data channels are accommodated in an FDM-FM voice carrier known as a Data Under Voice service, which is provided by AT&T. Other technologies narrowing channels and allowing closer channel spacing and more capacity have been found to be valuable technological advancements. In addition, there is provided apparatus for multiplexing a number of speech and low speed data channels on a single data multiplex system.

In such techniques as above, technical complexity is required to add the additional capacity without diminishing service on the previous or existing system. This includes, of course, non-interference with the existing channels.

OBJECT AND SUMMARY OF INVENTION

It is therefore a general object of the present invention to provide an improved communications system either for fixed to fixed site or fixed to mobile site through additional channels which may be utilized with an already established communications system.

In accordance with the above object, there is provided an advance mobile phone service system having a plurality of contiguous cells each with a cell site having a radio transceiver with voice and setup channels for communicating with mobile units within the cell. Each of the channels has a predetermined frequency bandwidth, a predetermined portion of the channels for each cell having alternate non-used channels between used channels to provide adequate adjacent channel separation while information is being transmitted on a used channel at a predetermined power level. The system is characterized by additional data channels for carrying digital data, including means for transmitting digital data to and from at least one field unit in a cell and the cell site, concurrently with information on a said used channel, each of the additional channels having a frequency centered substantially midway between the used and unused channels of the same or adjacent cell and including means for transmitting on the additional channels at a power at least an order of magnitude lower than the predetermined power level and for controlling the bandwidth spreading of the additional channels to prevent interference with adjacent used channels.

BRIEF DESCRIPTION OF DRAWINGS

FIG. 9 is a diagrammatic view of a cellular communications system embodying an alternative embodiment of the invention which provides for locating a mobile beacon.

FIGS. 10A and 10B are timing diagrams illustrating the operation of a portion of FIG. 7.

DESCRIPTION OF PREFERRED EMBODIMENT

Figure 1:
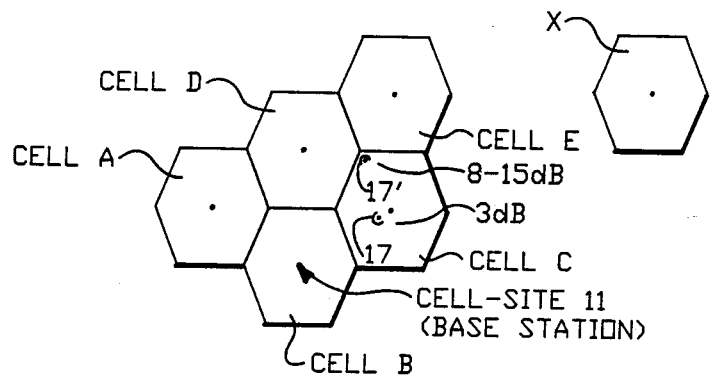
FIG. 1 is a diagrammatic view of a cellular communications system embodying the present invention.

The data system of the present invention is used in conjunction with what is known as a cellular mobile radio system or more technically, an advanced mobile phone service (AMPS) system. Such a system as illustrated in FIG. 1 has a number of hexagonally shaped contiguous cells (cells A, B, C, D, E and X are illustrated), each with a cell site 11 which is a base communications station having a transceiver with the capability of calling (paging) a mobile phone or receiving (accessing) a call from a mobile phone. Such a phone system is described in articles in the Bell System Technical Journal, January 1979, entitled, "The Cellular Concept" on page 15, and a second article entitled "Control Architecture" on page 43.

Figure 2:
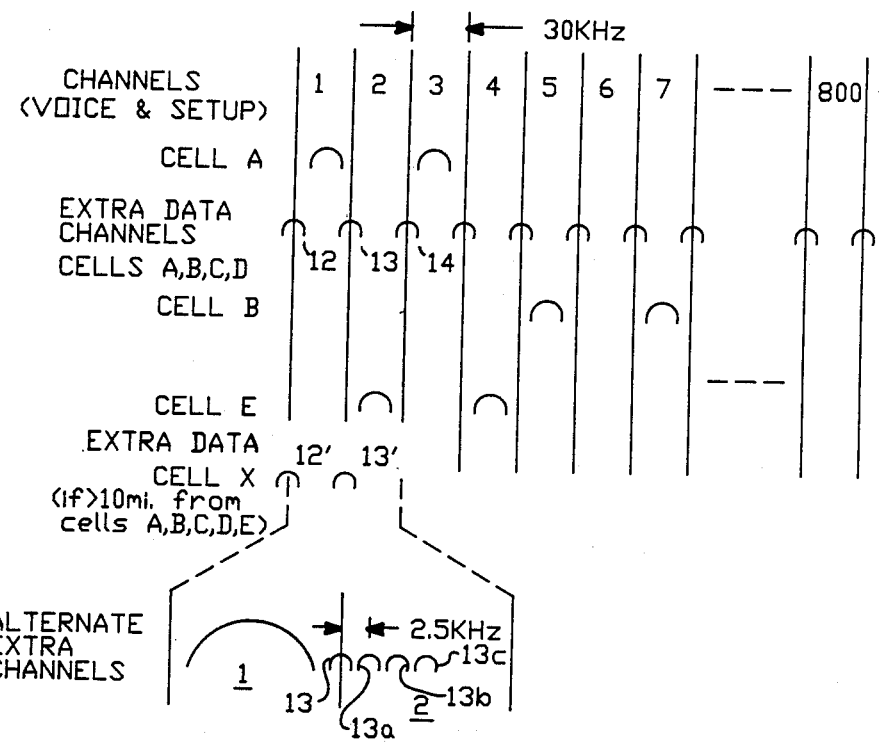
FIG. 2 is a frequency or channel allocation chart showing the additional channel or extra communications channels provided by the present invention and their frequency location.

The Federal Communications Commission (FCC) has allocated to the AMPS Cellular Service 800 two-way channels with 30 kHz of frequency spacing between channels. (This is illustrated in FIG. 2.) From a specific standpoint 800 of the channels are for transmitting from a mobile field unit (e.g., an automobile) and another 800 (offset by 45 MHz) for transmitting to the automobile. The channels are used in typical urban areas in a pattern of cells, as illustrated in FIG. 1, each cell covering an area of several square miles. The cells are placed to cover the areas served. There may be ten to twenty such cells covering a typical urban area. In the AMPS Cellular Service, each cell will have one channel for control or setup and typically two to twenty channels for voice services.

The setup channels are for the purpose of paging mobile phones, giving access to the phones, and avoiding collisions between competing mobile phones. The cellular system requires transmission of control signals that fully occupy 20 kHz of spectrum each; they even contain significant amounts of energy over a bandwidth of 40 kHz. As a result, a normal Cellular receiver will experience an unacceptable amount of interference if it is spaced only 30 kHz from an interfering channel. For this reason, cellular frequency planning guidelines suggest a spacing of at least two channels or 60 kHz between channels within the same cell or between a channel in one cell and a channel and any cell immediately adjacent to it. This requirement for acceptable cellular operation leaves space, in frequency and area, for a properly designed system.

The foregoing is shown in FIG. 2 where, for example, cell A occupies channels 1 and 3, cell B, which is adjacent to cell A, channels 5 and 7, and then cell E, which is non-adjacent to either cell A or cell B, is allowed to occupy channels 2 and 4 which are channels immediately adjacent in frequency to the respective channels 1 in cell A and 5 in cell B.

In addition, the setup channels, since they relate to the control aspects of an AMPS cellular system, generally have fixed channel allocations. On the other hand, the voice channels may from time to time be moved from one cell to another to accommodate change in demand. Thus, in view of the fixed nature of the setup channels, it may be preferred initially to utilize the system of the present invention in conjunction with the setup channels.

The cellular data system of the present invention, in its preferred embodiment, uses 2 kHz bandwidth 2 kb/sec data carriers operating at positions ±15 kHz off the cellular channels in each cell. The spectral width and the transmitter power of each digital channel is closely controlled to prevent interfering energy from entering the receiver of the adjacent "standard" cellular channel. Thus, a pair of channels, one 15 kHz higher and one 15 kHz lower, as illustrated in FIG. 2, can be used next to every channel which is allocated in the cellular system, either voice or setup channel.

This channel location, ±15 kHz off the cellular channels in each cell, is guaranteed to also be noninterfering with standard channels located at +30 kHz and −30 kHz since by AMPS standards such channels will not be located within the central cell or within any immediately adjacent cell.

In the AMPS Cellular System, there are 800 two-way channels. Thus, as illustrated, there may be 1600 extra two-way data channels. In addition, as illustrated with respect to cell X, the same frequency can be used, that is at 12' and 13', if cell X is more than 10 miles from the other remaining cells. This may be possible in two or three other cells also in the urban area. Thus, in the same geographical urban areas, the entire system may accommodate as many as 4800 two-way data channels. Thus, the total data carrying capacity of all channels in an urban area is as much as 9.6 Mb/sec.

Figure 3:
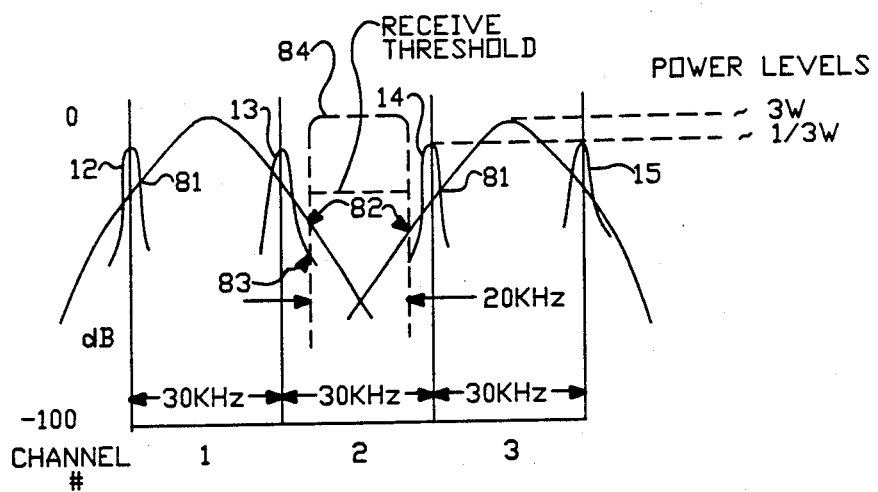
FIG. 3 is a more detailed enlarged view of a portion of FIG. 2 showing the interaction between standard communications channels and the extra channels of the present invention.

FIG. 3, in an enlarged format, indicates the additional channels 12 through 15 in conjunction with "standard" channels 1, 2 and 3 and shows the relative power levels which have been found ideal to maintain an adequate separation and prevent interference. Thus, the nominal power level of channels 1 and 2 is approximately 3 watts in the AMPS system, as indicated, with the power level of the additional channels 12-15 being substantially one-third of a watt; in other words, it is a power level which is an order of magnitude lower.

Then, in conjunction with a technique for controlling bandwidth spreading, interference does not occur between the additional channels and the existing channels 1 and 3 until a low dB level 81 has been reached. This is a low enough level so as not to interfere with an existing operating channel of the cellular system.

In addition to the very necessary elimination of interference between the additional channel and the existing used channel on which the additional channels ride as if on the "shoulder" of the used channel, interference must be prevented with the receivers of the adjacent channel #2, as illustrated in FIG. 3. Referring to FIG. 1, such interference would occur when a field unit is transmitting in cell A and that signal, for example, reaches cell E, where channel 2 is an active used channel. In the existing cellular system, interference is prevented by the relatively low power level indicated at 82 at which the transmitter bandwidth characteristic of channels 1 and 3 overlap into channel 2 and intersect with the receive bandwidth characteristic of channel 2 indicated by the dashed outline 84. This receive bandwidth is relatively narrow (20 kHz, for example, as opposed to the nominal 30 kHz spacing of the channels) and thus intersects the transmissions of channels 1 and 2 at a fairly low power point on their transmission bandwidth characteristics.

In a similar manner the additional channels provided by the present invention, namely, channels 13 and 14, as illustrated in FIG. 3, have an intersection point with the receive bandwidth characteristic curve 84 at a point equal to power level 82, or as indicated at a lower point 83.

Thus, the unique location of the additional channels midway between the existing channels of the cellular system is guaranteed to interfere with an adjacent channel less than the already existing interference vcaused by the out of band power of the channels 1 and 3. And both of these power levels, namely, 82 and 83, are below the receive threshold level so indicated in FIG. 3.

Figure 4:
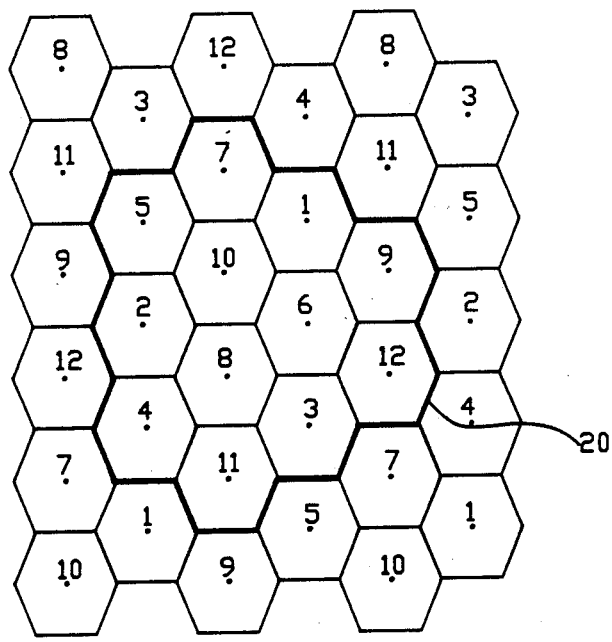
FIG. 4 is a deployment pattern for a center fed cellular system.

FIG. 4 shows a common technique of assigning the AMPS channels in a pattern following the rules that no adjacent channel can be used in the same or adjacent cells and that no channel may be used again any closer than 2½ cell diameters. In FIG. 4 there are twelve cells grouped in a cluster; that is, the twelve cells within the darkened outline 20. Each cell is served by an antenna mounted in its center and radiating power equally in all directions. This is called a center-fed cell. In this pattern, twelve consecutive channels, spaced 30 kHz from each other, are assigned to the twelve cells. Note that no consecutive numbers are placed in adjacent cells and that channel 1 is not adjacent to channel 12.

Figure 5:
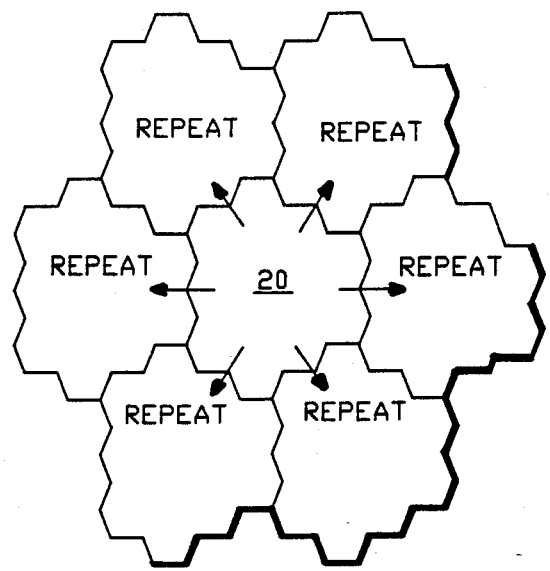
FIG. 5 is an illustration of the repeated use of the deployment pattern of FIG. 4.

If more area coverage is required than covered by the twelve cells, the pattern is repeated to the left and to the right with the same exact pattern of assignment. The pattern can also be repeated up and down, shifted by 60°, as shown in FIG. 5. With this repeat pattern, an arbitrarily large area can be covered reusing the same twelve channels many times. The twelve channels are so organized within the basic pattern outlined in dark 20 such that with the repeated expansion still no channels (even at borders between the basic pattern) are assigned with adjacent channels in adjacent cells. Also, in the repeated pattern a channel always appears at least 2½ cell diameters away from any other cell using the same channel.

If more than one channel is needed in each cell, then a second set of twelve channels can be assigned in the same pattern, with channel 13 being in the same cell as channel 1, channel 14 being in the same cell as channel 2, and so on until channel 24 is in the same cell as channel 12. Similarly, if a third channel is required in each cell, channels 25 through 36 can be assigned in the same manner.

The 800 channels can be divided into groups of twelve and assigned as described to cover the projected service needs. If thirty-six cells were sufficient to cover an urban service area, the 800 channels would each be used three times in the area. That is a total of 2,400 channels that would provide service.

Using the technique of the present invention, for each of the normal service channels described above two 2 kb/s data channels could be placed on its edges, one at +15 kHz and one at −15 kHz from the normal service frequency. Control of the power as described above would allow the new service to be offered with no interference to the old service.

The above pattern or similar ones meeting the same adjacent channel and co-channel interference criteria are used in AMPS systems. The patented technique is designed to work on any and all such patterns of frequency assignment.

Figure 6:
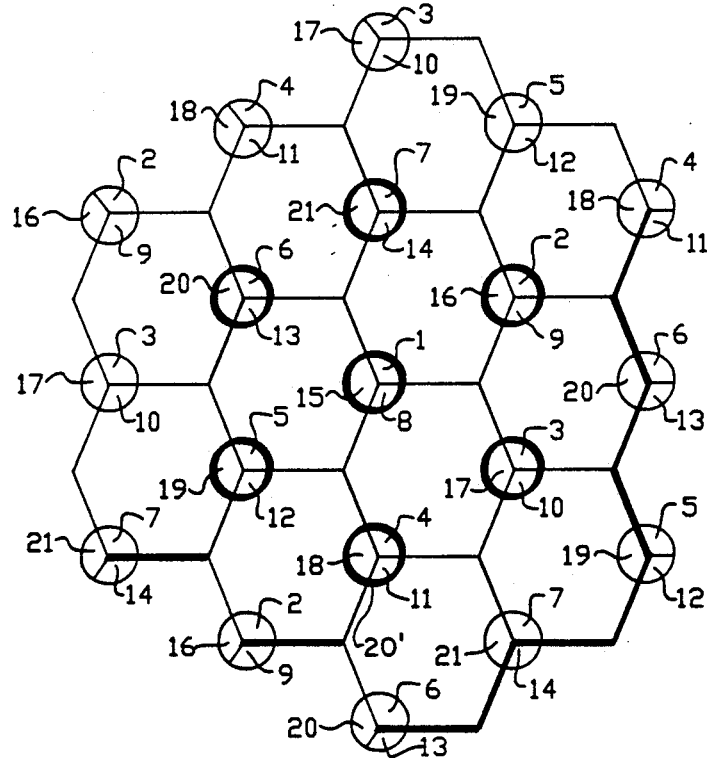
FIG. 6 is a deployment pattern for an edge fed cellular system.

Another technique used to prevent interference in the AMPS system is shown in FIG. 6. This technique employs edge-fed cells. The base station towers are placed on the borders between the cells. On each tower, three antennas, each with its own unique channels, are used to broadcast into the three adjoining cells. Each antenna is directional, concentrating its energy or sensitivity into its cell and restricting energy or sensitivity into the other two adjacent cells. Each antenna covers only 120° of angle. As shown, three antennas cover each cell from three of its corners.

In FIG. 6, twenty-one channels are assigned to a group of seven cells, three to each cell, i.e., one on each of the three towers at the cell's corners. The pattern is repeated to the upper right at 60° angles and to the upper left at 30° angles to cover an entire area.

In this allocation technique, the protection is dependent both on antenna pattern directivity and on cell spacing. Note that adjacent cells are assigned adjacent channels, i.e., channels separated by only 30 kHz from each other. In the basic set of seven cells in FIG. 6 note that channel 5 is serving a cell that is adjacent to a cell above served by channel 6 and a cell to its lower right served by channel 4. This is allowed because the antennas radiating the energy for channel 4 and channel 6 are pointing away from the area served by the antenna radiating the energy for channel 5. A mobile receiver listening to signals from channel 5 in the central cell will have the extra protection from the directivity of the antennas radiating energy on channels 4 and 6 in the adjacent cells. These antennas do not radiate full signal strength into the cell using channel 5.

Similarly, the mobile transmitting its signals back to the tower receiving channel 5 will be received on that tower's antenna with high sensitivity. Other mobiles in the two adjacent cells on channels 4 or 6 will be received at the central tower (channel 5) with lower sensitivity because they are outside of the main antenna pattern.

Note also that when the pattern is repeated right or left or up or down the same channel is reused at a distance that is only a little more than 2 cell diameters. However, again note that the two antennas are not facing towards each other. This added antenna selectivity allows the spacing for reuse to be reduced.

This edge-fed cellular frequency plan is used in many AMPS installations. In most applications irregularities in geography and in service requirements in each cell have resulted in a mix of edge-fed and center-fed cells being used.

In the edge-fed application, the invention is implemented by radiating the 2 kb/sec new data channels located ±15 kHz from the normal service channels with the same antenna patterns used by the normal AMPS service. This is done either by using the same antennas (through duplexer antenna couplers) or by using a separate antenna with the same pattern as the normal antenna.

With this technique, the new data service has the same interference improvement from antenna directivity as the normal AMPS service. The protection between new service and the normal service is the same as in the center-fed case.

The preferred embodiment of the invention is to use the same mix of edge-fed and center-fed cell coverages as used in the AMPS service, placing two data carriers, one at +15 kHz and one at −15 kHz from the normal channel in each cell and using the same coverage patterns as the normal channels.

Two other strategies (outlined below) are claimed as usable under some circumstances, but not normally as effective as the preferred embodiment described above.

In a few AMPS applications, because of very high demand or special geographic conditions, some cells will use adjacent channels in adjacent cells even though the cells may be center-fed. This does cause extra service loss in the normal system. Loss is reduced by control of power in the two cell sites, but usually it is not reduced to the levels encountered with the normal frequency plans.

In these non-standard AMPS installations, the invention is used just as in the standard application. That is, two data channels are used at ±15 kHz from the normal channel and at an order of magnitude less power. This will provide some interference to the services in the adjacent normal channels in the adjacent cells. However, this interference, for the reasons illustrated in FIG. 3, will be no worse than the interference caused by the normal system itself.

A second alternative embodiment is also shown in FIG. 2. In this embodiment, the new data channels 13a, 13b, 13c, etc., are located at greater than ±15 kHz separation from the normal channel, for example, at ±17.5 kHz, ±20 kHz, ±22.5 Hz or ±25 kHz. The power of the data carriers is more than an order of magnitude less than the normal carriers. By spacing the channels farther from the normal channel and using directional antennas on the remote data transceivers, the base station data transmitters can be reduced to even lower values. This reduction will in many cases prevent interference to mobiles receiving the normal channels at ±30 kHz since they typically are located more than 2½ cell diameters away from the service cell. Similarly, the directional antenna of the remote data transceiver prevents power of its transmission from interfering with the normal base station receivers at ±30 kHz located at least 2½ cell diameters away.

While it is possible to add the data channels in this way, the application is complicated by the need to closely coordinate directionality of both the base station and remote transceiver antennas of the data system. It is also very difficult to the point of impracticality for mobile data users. It is also subject to added complexities when the normal AMPS channels are moved to meet changing demand. For these reasons, while this technique is an alternative embodiment, it is not preferred in normal applications.

Figure 7:
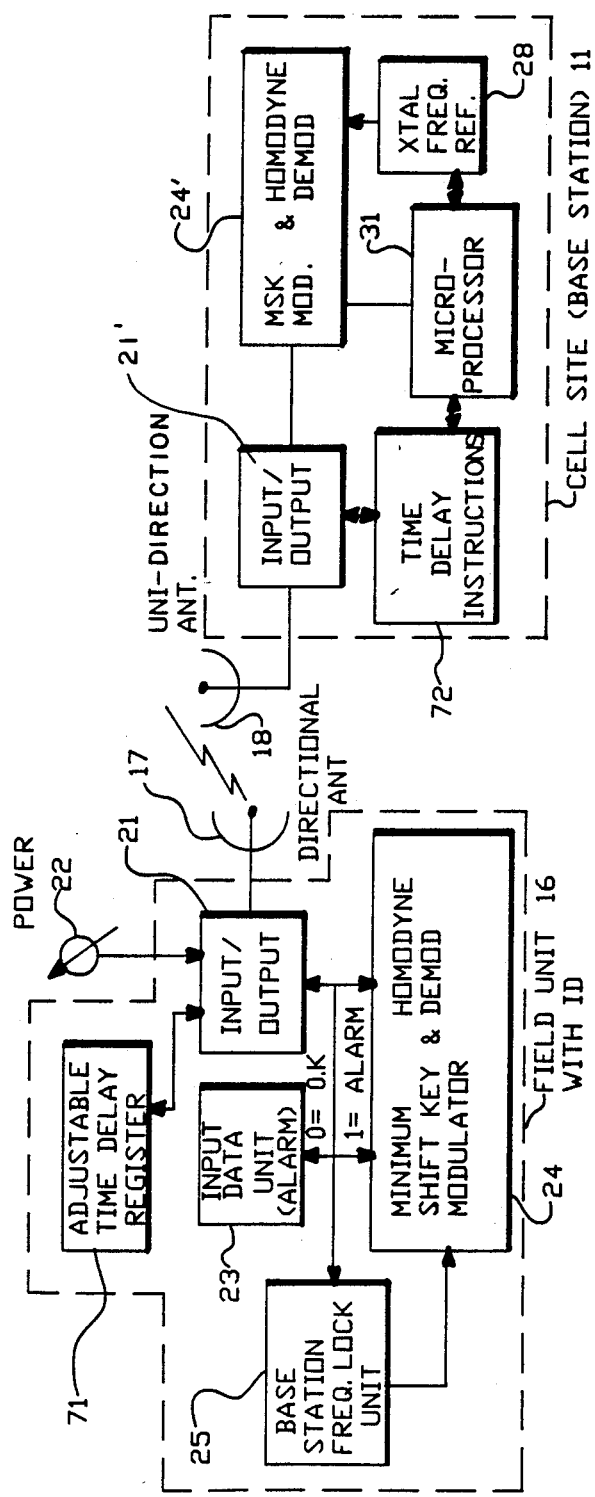
FIG. 7 is a circuit block diagram illustrating the present invention.

FIG. 7 illustrates a typical circuit block diagram of the equipment necessary to implement, for example, an extra channel 12. Within a cell is a field unit 16 having a directional antenna 17 aimed at the unidirectional antenna 18 of the cell site or base station 11. Referring briefly to FIG. 1, two directional antennas are shown one at 17 and one at 17' which is at the periphery of a cell. The closer directional antenna (since it is fixed and not mobile in one particular context of the present invention), has a gain of only three decibels whereas the peripheral antenna 17′ may have a gain of 8 to 15 decibels. Thus, the power of the antenna is adjusted to that amount necessary for adequate transmission and reception. The closer it is to the base station the less power is necessary. Thus, this preserves the power relationship illustrated in FIG. 3 where the power level for the additional channel is substantially an order of magnitude lower than the normal power of the standard channel.

Referring again to FIG. 7, in the field unit 16, which has its individual identification code, there is an input/output unit 21 which either receives or transmits information and with a power level regulated by an automatically adjustable input 22 connected to the output unit 21. Input data from a unit 23 is typically converted to digital format by a minimum phase shift keying (MSK) modulation technique in unit 24 and coupled to antenna 17 via output unit 21. Unit 24 also acts as a homodyne demodulator for received information. Finally, field unit 16 includes a base station frequency lock unit 25 which locks on to the signal frequency from the cell site 11 to thus allow each field unit to utilize as a carrier frequency reference the frequency reference of the base station 11, which is provided by a precision crystal.

The input data unit 23 is also designated "alarm" to indicate one of the preferred uses of the present invention. That is, as a system to monitor on a continuing basis the status of associated alarm units, for example, either for antitheft purposes or for safety purposes. In other words, the field unit 16 would be paged by the base station perhaps once every 30 seconds to ascertain whether or not it is in an alarm state or if it is functioning normally. For example, a binary '0' might indicate 'O.K.' and a binary '1' an alarm. In a co-pending application entitled "Method of Radio Data Communication" filed Sept. 9, 1988, Ser. No. 242,958, such a paging technique is described.

The foregoing co-pending application also discusses an efficient use of the communications system of the present invention where, as illustrated in FIG. 7, effective response time in a time division multiplexing mode, is provided by an adjustable time delay register 71. This register is loaded by instructions from time delay instruction unit 72 of the base station 11 so that each field unit 16 is given a unique time delay in which to respond in sequence to a request from the base station. In addition, the time delay register has a fixed portion which is keyed into the ID number of the field unit so that the initial response binary width response of a '0' or '1' is provided in the proper time division multiplex sequence without one field unit in a cell interfering with another. This provides for very efficient utilization of the additional communications channels provided and allows a relatively low data rate to be used to thus minimize frequency spreading, which is of course a critical requirement of the present invention.

Input data unit 23 may also be utilized for any type of home or office management system monitoring such as remote meter reading, etc. In addition, any type of digital communication and even digitized voice, which is compressed, may be used. All that is required is that the relatively low digital data rate, such as 2 kb/sec be sufficient. The technology is especially useful with the paging technique of the above co-pending application in sporadic data applications. One of these might be automatic teller machines where the communication is in short blocks separated by large time intervals. Others include answer back paging and access to data terminals in vehicles.

Another application might be as illustrated in FIG. 9 where the modified cell site antennas 17′ are utilized, for example, in cells B and D, to sense by well known angular tracking techniques (for example, see the Loran Navigation System) the location of a truck or car 30 (in cell C) carrying a locating beacon. Here the cell sites 11 would respond both to the angle and the frequency and time of transmission for proper correlation of data. This application has use in vehicle theft monitoring and location.

And finally, although the use of stationary field units 16 is illustrated, mobile field units could also be accommodated for the same reasons that they're accommodated in a normal cellular systems. But the power levels would still be maintained as above and the data transmission rate and frequency spreading would be carefully controlled by the above technology to meet the non-interference criteria set out above.

Still referring to FIG. 7, at the base station or cell site 11, there is a circuit almost identical to field unit 16. An input/output unit 21′ feeds mod/demod 24′. Crystal frequency reference 28 is oven controlled to provide a precise carrier frequency reference for all field units. A microprocessor 31 provides overall control of the system—at least the additional channel and the accessing and recording of needed information. For example, if the input data is an alarm indication for security purposes, then the microprocessor would cause an immediate investigation to take place at the location of that particular field unit.

Figure 8:
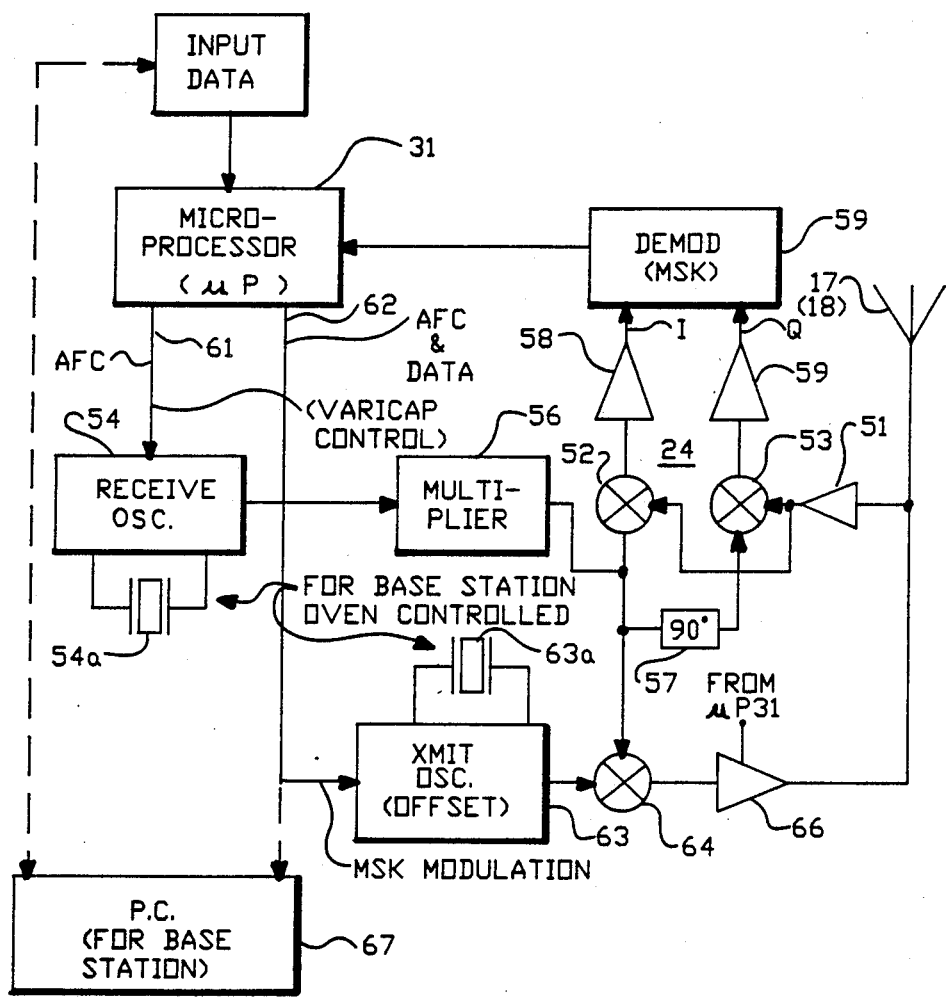
FIG. 8 is a more detailed diagram of FIG. 7.

FIG. 8 is a more detailed block diagram of both the field unit 16 in solid outline and shows in dashed outline at least part of the modification for the base station or cell site 11. First, considering the field unit 16 only, the antenna 17 receives input data which is amplified by an amplifier 51 and is fed to a homodyne type demodulator generally indicated at 24, which includes the mixers 52 and 53. The other mixing input comes from a receive local oscillator 54 which drives a multiplier 56, which in turn is directly connected to mixer 52 but has its signal delayed by 90° in unit 57 for the mixer 53. This then provides via amplifiers 58 and 59 signals (with a carrier frequency suppressed—in other words, a homodyne technique) of I and Q components. A demodulator unit 59 then processes the signal which, as discussed above, has been quadrature phase shift modulated and this is coupled to the microprocessor 31.

In operation, demodulator 59 gives a net count of the average frequency of the received waveform. This count is processed by microprocessor 31 and is used as a frequency error detector to control via the lines 61 and 62 the receive oscillator 54 and the transmit oscillator 63.

Specifically, the transmitter data is encoded with a net of a zero frequency offset over a ten second interval to provide the resultant demodulated signals to be used for a simple automatic frequency control (AFC) correction. In other words, the receive oscillator 54 is adjusted to provide a zero difference frequency via the mixers 52 and 53 during this test period. And local oscillator 54 includes a varicap control which adjusts the low cost crystal 54a, which is a part of the receive oscillator. Such control provides an error of ±160 Hz. The transmit frequency is generated by the same receive oscillator 54, plus an offset transmit oscillator 63 (which is offset a nominal 45 megahertz from the receive oscillator). It also includes a low cost crystal 63a which is also adjusted with the same correction on line 62 as was done for the receive oscillator. This may also be done by a controller table lookup in conjunction with the correction factor. Thus, a transmit mixer unit 64 provides via adjustable gain amplifier 66 the transmit frequency of the field unit 16.

Finally, the adjustable gain amplifier 66 receives from microprocessor 31 a proper voltage gain indication so that the signal is maintained at the relatively low power level discussed in FIG. 3; that is, a power that is significantly below the power of the standard signals of the cellular system. Microprocessor 31 via line 62 to the transmit oscillator 63, of course, also provides either quadrature phaseshift modulation or minimum shift keying modulation to provide digital data transmission back to the base station 11.

When the transceiver of FIG. 8 is utilized as a base station, since the base station will provide a frequency reference for all of the field units, the crystals 54a and 63a are oven controlled with a precision of ±0.2 ppm. Thus, there is no AFC. In addition, there is a relatively large scale computer designated PC 67 which provides for necessary data processing functions. Of course, the transmit and receive frequencies are reversed from the field unit 16. Other portions of the more detailed aspects of the circuit of FIG. 8 have not been shown since they are well known such as the use of filters, etc.

By the use of precision oven controlled crystal frequency references at only the base station 11, and then utilizing this precise frequency in all of the field units, low cost crystals may be used in the field units. This provides for very precise additional digital channels and is especially important in the context of the present invention where, as is clear from FIG. 3, a slight shift in frequency would cause undesired interference with, for example, an active or used cellular voice or control channel.

In addition, to provide the necessary low power signal, a homodyne demodulation technique is utilized where the carrier is suppressed. This, in combination with a minimum shift keying modulation (MSK) technique provides in the preferred embodiment a low cost and robust system which can operate effectively at the low powers required.

FIGS. 10A and 10B illustrate an alternative staggered quadrature phase shift keying modulation (SQPSK) technique. The digital data to be transmitted may be in any one of the four indicated quadrants. The Q direction is the horizontal direction and the I direction is the vertical direction. In a normal quadrature phase shift phase shift modulation technique, when, for example, one is at the data point 32 and wishes to proceed to data point 33, this is done via the indicated dashed line. However, this will cause additional bandwidth spreading. By using a staggered system, as illustrated in FIG. 10A, first the Q shift is made as indicated by the solid arrow to point 34 and then the I shift made to the destination point 33. And the data is sensed as indicated by the dashed line in FIG. 5B after both shifts have been made. This two step staggered shift also reduces bandwidth spreading, as indicated in FIG. 3, and thus, interference occurs only at a very low decibel level.

Thus, the use of minimum shift keying (MSK) modulation will provide a rapid decrease of spectrum away from the digital data carrier. SQPSK is also suitable. Other techniques are BPSK (binary phase shift keying), quadrature AM or merely AM modulation techniques. However, QPSK or MSK modulation is believed to be optimum.

In summary, the present invention has provided a cellular communications system while not incurring the high cost of normal cellular channels. In other words, monitoring a transceiver with a cellular call every 30 seconds would use scarce capacity in many cell sites and be prohibitively expensive. The solution of the present invention in providing an extra or additional channels without interfering with existing channels is simple, elegant and low cost.

With the frequency coordination scheme discussed above, the space made available by the necessary clearance strategies required in the cellular channels is effectively utilized without interference because of the low power, narrow bandwidth and assignment pattern of the extra channels. The invention is even more effective because of its ability to transmit digital data at a fairly high data rate, but with low bandwidth and rapid response time.

In any communications system employing standard channels and allocated in an area so as to reuse the frequency without adjacent channel interference or co-channel interference, the present technique can be used to implement an additional lower bandwidth, lower power service without interference. This may even occur in the evolution of the present day cellular system where, due to the advancements in digital technology, the voice channels may become digital and have narrower channels than the current system. Such a conversion of existing cellular systems to all digital may certainly occur in the future, since in many cities, voice channels are now largely occupied at peak usage time. The present invention will be applicable in the new system as well as in the current system. It will add additional digital services without interfering with the basic service.

In addition to uniquely utilizing the available narrow band space, techniques of transmission and reception are optimized for low cost and narrow bandwidth. And as discussed above, these include the low power transmission in a digital format, along with quadrature (or minimum) phase shift keying modulation, homodyne demodulation, the use of a crystal locking frequency controlled from the base station and efficiency of data transmission enhanced by a time division multiplexing technique.

To reiterate the necessity of the foregoing requirements, a part of the concept of positioning the additional digital channels so as not to interfere with the existing cellular channels and taking advantage of the existing cellular frequency architecture is that the additional channel be transmitted at a relatively lower power. And to provide effective transmission at this lower power the digital data must be picked up without error but at the same time, because of the mass distribution of a system of the present type, at relatively low cost; such mass use includes connection to burglar alarms, mobile beacons, automatic teller machines, etc. This goal is achieved by optimizing the modulation for error-free transmission by way of utilizing either quadrature or minimum phaseshift keying modulation, optimizing the demodulation by the homodyne technique and providing in an inexpensive manner precise frequency location of the additional channels.

An optimum use of the above system utilizing the 2.4 kb channel capacity is set out in the co-pending application (mentioned above) which is incorporated herewith entitled "Method of Radio Data Communication," filed Sept. 9, 1988, Ser. No. 242,958, in the name of Bruce Lusignan.

What is claimed:

1. In an advanced mobile phone service system having a plurality of contiguous cells each with a cell site having a radio transceiver with voice and setup channels for communicating with mobile units within the cell, each of said standard voice and setup channels having a predetermined frequency bandwidth, a predetermined portion of said channels for each cell having alternate non-used channels between used channels to provide adequate adjacent channel separation while information is being transmitted on a used channel at a predetermined power level, a plurality of said cells being grouped in a cluster to provide a number of disjoint channel sets, such sets avoiding both adjacent channel and co-channel interference while providing for frequency re-use by geographical placement of cells in a cluster having adjacent channels in different cells with at least one intervening cell between them and channels of the same frequency separated by at least one intervening cell between them, characterized by additional data channels for carrying digital data, including means for transmitting said digital data to and from at least one field unit in a cell and said cell site, concurrently with information on a said used channel, each said additional channel having a frequency centered substantially midway between said used and unused channels of the same or adjacent cell and including means for transmitting on said additional channels at a power at least an order of magnitude lower than said predetermined power level and for controlling bandwidth spreading of said additional channels to prevent interference with adjacent used channels.

2. A system as in claim 1 where said radio transceiver of a said cell site has a transmit bandwidth greater than said standard channel bandwidth, at low power levels, and a receiver bandwidth narrower than a said channel bandwidth, said transmit bandwidth of one channel intersecting with the receiver bandwidth of an adjacent channel in another cell, said adjacent channel having a predetermined receive threshold level, but below said receive threshold level, said frequency centering of said additional channel providing an intersection of its bandwidth at or below said intersection of said transmit and receiver bandwidth.

3. A system as in claim 1 where said means for controlling bandwidth spreading include modulation means of the minimum shift keying type.

4. A system as in claim 1 where said field unit includes a directional antenna aimed at said cell site.

5. A system as in claim 1 where said predetermined frequency bandwidth is 30 kHz and said additional channels have a frequency offset from the center of a said used channel of substantially 15 kHz.

6. A system as in claim 4 where the gain of said field unit is adjustable.

7. A communications system having a central radio transmitter and receiver site for simultaneously communicating with a plurality of field units over a plurality of standard channels comprising:

means for transmitting information on additional channels to and from a plurality of additional field units and said central site, concurrently with information on said standard channels, said additional channels having a frequency offset from said standard channels, said transmitting means including minimum shift keying modulation and demodulation means for minimizing bandwidth spreading, said central site including precision frequency generating means said field units including means for utilizing said precision generating means as a frequency reference for such field unit, and means included in said central site and said additional field units for time division multiplexing over a single additional channel, for carrying data at a predetermined data rate, responses from a plurality of additional field units to said central site to minimize the data rate of said single channel and its bandwidth.

8. A system as in claim 7 where said means for time division multiplexing includes adjustable storage register means in said field units for providing nonconflicting responses.

9. A system as in claim 7 where said responses are substantially of one bit width.

10. A communications system as in claim 7 where said system is cellular, said central site is a cell site, and said field units are within a cell.

11. In an advanced mobile phone service system having a plurality of contiguous cells each with a cell site having a radio transceiver with voice and setup channels for communicating with mobile units within the cell, each of said channels having a predetermined frequency bandwidth, a predetermined portion of said channels for each cell having alternate non-used channels between used channels to provide adequate adjacent channel separation while information is being transmitted on a used channel at a predetermined power level, a plurality of said cells being grouped in a cluster to provide a number of disjoint channel sets, such sets avoiding both adjacent channel and co-channel interference while providing for frequency re-use by proper use of directional antennas with adjacent channels in respectively adjacent cells being isolated by the directionality of said antennas; characterized by additional data channels for carrying digital data, including means for transmitting said digital data to and from at least one field unit in a cell and said cell site, concurrently with information on a said used channel, each said additional channel having a frequency centered substantially midway between said used and unused channels of the same cell or adjacent and including means for transmitting on said additional channels at a power at least an order of magnitude lower than said predetermined power level and for controlling bandwidth spreading of said additional channels to prevent interference with adjacent used channels in another cell.

12. In an advanced mobile phone service system having a plurality of contiguous cells each with a cell site having a radio transceiver with voice and setup channels for communicating with mobile units within the cell, each of said channels having a predetermined frequency bandwidth, a predetermined portion of said channels for each cell having alternate non-used channels between used channels to provide adequate adjacent channel separation while information is being transmitted on a used channel at a predetermined power level, characterized by additional data channels for carrying digital data, including means for transmitting said digital data to and from at least one field unit in a cell and said cell site, concurrently with information on a said used channel, each said additional channel having a frequency centered substantially midway between said used and unused channels of the same or adjacent cell and including means for transmitting on said additional channels at a power at least an order of magnitude lower than said predetermined power level and for controlling bandwidth spreading of said additional channels to prevent interference with adjacent used channels.

* * * * *